United States Patent [19]

Cropley

[11] Patent Number: 5,257,710
[45] Date of Patent: Nov. 2, 1993

[54] VEHICLE ROOF RACK
[75] Inventor: Richard Cropley, St. Ives, Australia
[73] Assignee: Fetovu Proprietary Limited, Australia
[21] Appl. No.: 945,053
[22] Filed: Sep. 15, 1992
[30] Foreign Application Priority Data
  Sep. 17, 1991 [AU] Australia ............................. PK8410
[51] Int. Cl.$^5$ ............................................... B60R 9/00
[52] U.S. Cl. .................................... 224/331; 224/322
[58] Field of Search ............... 224/331, 330, 329, 325, 224/326, 322

[56] References Cited
U.S. PATENT DOCUMENTS

| | | | |
|---|---|---|---|
| 3,722,765 | 3/1973 | Binding | 224/331 |
| 3,920,167 | 11/1975 | Parsons | 224/330 |

FOREIGN PATENT DOCUMENTS

| | | | |
|---|---|---|---|
| 21423/88 | 2/1989 | Australia . | |
| 2551646 | 6/1977 | Fed. Rep. of Germany | 224/331 |
| 3112214A1 | 10/1982 | Fed. Rep. of Germany . | |
| 3220052A1 | 12/1983 | Fed. Rep. of Germany . | |
| 3609766 | 10/1987 | Fed. Rep. of Germany | 224/331 |
| 3612332A1 | 10/1987 | Fed. Rep. of Germany . | |
| 1316572 | 5/1965 | France . | |
| 395764 | 12/1965 | Switzerland | 224/331 |
| 555756 | 11/1974 | Switzerland . | |
| 9110581 | 7/1991 | World Int. Prop. O. | 224/329 |

Primary Examiner—Linda J. Sholl
Attorney, Agent, or Firm—Nikaido Marmelstein Murray & Oram

[57] ABSTRACT

A leg assembly for a vehicle roof rack comprises a rigid leg adapted at its top end to be fastened to a cross-beam and terminating at its bottom end in a downwardly projecting inner edge flange adapted to enter a vehicle roof gutter to sit upon the floor thereof, a clamping element itself comprising a body having a lower inner face adapted, in use, to bear against the outer surface of the gutter wall and having a lower edge flange then projecting under the gutter and an upwardly extending upper edge flange having an upper part adapted to bear against an outwardly inclined camming surface on the outside of the leg, and self-aligning draw bolts to draw the clamping element upwardly towards the leg; the line of action of the draw bolts extending through the clamping element intermediate of said edge flanges thereby enabling the clamping element to be loaded inwardly against the outer wall of the gutter as well as being loaded upwardly against the floor of the gutter. When the parts are assembled and the draw bolts are tightened, the clamping element is drawn upwardly towards the leg so as to bear against the gutter. Towards the end of the tightening action the contact between the clamping element and the camming surface moves the upper part of the clamping element outwardly to bring the lower inner face into firm engagement with the wall of the gutter.

10 Claims, 3 Drawing Sheets

VEHICLE ROOF RACK

BACKGROUND

This invention relates to vehicle roof racks, for the carriage of external loads, of the kind which sit upon and are secured to the roof gutter customarily found on cars and commercial vehicles. Such roof racks are well known, being widely used by tradesmen and others for the transport of ladders, lengths of pipe, timber planks and like relatively heavy articles which are too long for stowage within the vehicle.

Conventionally, roof racks of the kind in question comprise at least two assemblies spaced apart in the fore-and-aft direction of the vehicle, and each comprising a cross-beam adapted to span from side to side of the vehicle's roof, two legs, one at each side of the vehicle with their feet resting on the floor of the roof gutter, which support the cross-beam above the roof, and clamping means to hold the legs to the gutter.

Those clamping means conventionally comprise, in respect of each leg, a hook or claw shaped component slideably located on the leg which is adapted to engage the under side of the gutter and which may be drawn upwardly to clamp the floor of the gutter between itself and the foot of the leg. That component frequently takes the form of a hook bolt with its threaded stem extending upwardly through a tube or guide way on, or formed in, the leg. In any event, the movement of that component of the clamping means has hitherto been restricted to upward linear movement. This has limited the ability of the clamping means to adjust to variations in the sizes and shapes of vehicle gutters found in practice and to hold the roof rack in position under emergency braking or crash conditions. Occasional accidental injury has occurred as a result of racks being dislodged under those conditions.

SUMMARY OF INVENTION

The present invention was devised to address that deficiency in the prior art, and does so by providing clamping means wherein the hook shaped element is not only self aligning to some degree but also is loaded inwardly against the outer wall of the gutter as well as being loaded upwardly against the floor of the gutter.

The invention consists in a leg assembly for a vehicle roof rack comprising a rigid leg adapted to be fastened to a cross-beam and having a projecting inner edge flange adapted to enter a vehicle roof gutter to sit upon the floor thereof, a clamping element itself comprising a body adapted, in use, to bear against the outer surface of the gutter wall and having a lower edge flange then projecting under the gutter and an upwardly extending upper edge flange having an upper part adapted to bear against an outwardly inclined camming surface on the outside of the leg, and at least one self-aligning draw bolt to draw the clamping element upwardly towards the leg; the line of action of the draw bolt extending through the clamping element intermediate of said edge flanges (thereby enabling the clamping element to be loaded inwardly against the outer wall of the gutter as well as being loaded upwardly against the floor of the gutter).

Preferably the leg assembly may comprise a leg, a clamping element and two draw-bolts each extending through cylindrical nuts, each nut conveniently received in a part cylindrical cradle formation enabling it to rotate about its cylindrical axis to a limited extent.

Preferably the leg may comprise a substantial columnar portion with a channel shaped upper end portion adapted to receive a roof rack crossbar and a bottom end adapted to present a more or less downwardly directed central end face, flanked by more nearly upright marginal faces. One marginal face may be the outer face of an inner edge flange adapted to enter a vehicle roof gutter with the free end of the flange resting on the floor of the gutter and the lower part of the marginal face contacting the inner surface of the gutter wall.

Further another marginal face may be concave outwardly so that at least its upper part is inclined outwardly of the axis of the draw bolt, that surface constituting a camming surface, as that term is used herein. In a preferred embodiment the lower inner face of the body is adapted to bear against the outer surface of the wall of the gutter, while a lower edge flange extends under the gutter to bear against the floor thereof.

Further an upper edge flange has a convex inner surface adapted to bear against the camming surface of the leg so that when the parts are assembled and the draw bolts are tightened, the clamping element is drawn upwardly towards the leg so as to bear against the gutter. Towards the end of the tightening action the contact between the clamping element and the camming surface moves the upper part of the clamping element outwardly to bring the lower inner face into firm engagement with the wall of the gutter. That movement is enabled because of the ability of the draw bolts to align themselves as needed.

By way of example, an embodiment of the above described invention is described in more detail hereinafter with reference to the accompanying drawings.

DETAILED DESCRIPTION OF THE PREFERRED EMBODIMENT

Figure 1:
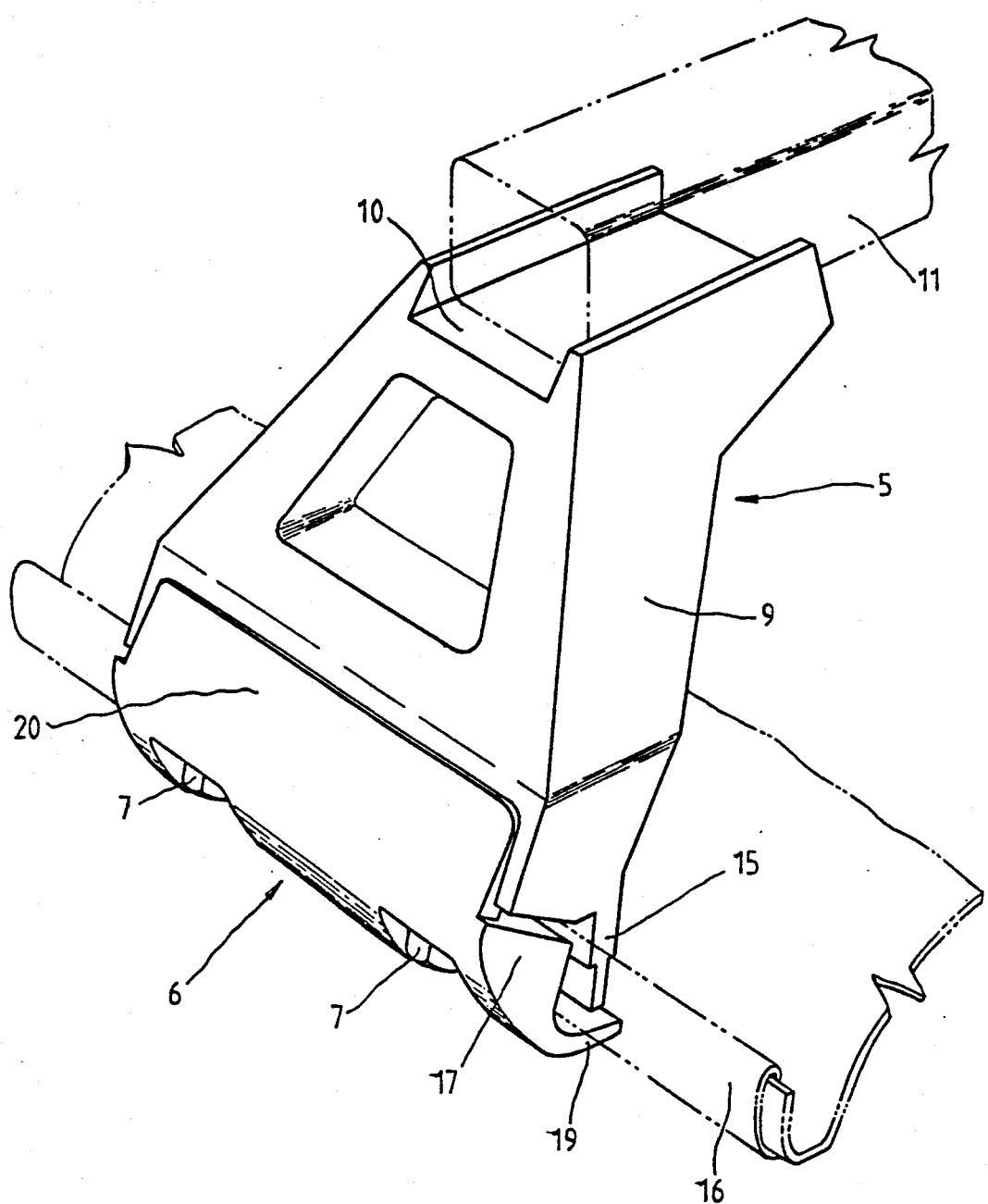
FIG. 1 is a perspective view of a leg assembly according to the invention shown in use, with the vehicle gutter and the rack cross-beam shown in ghost.
Figure 3:
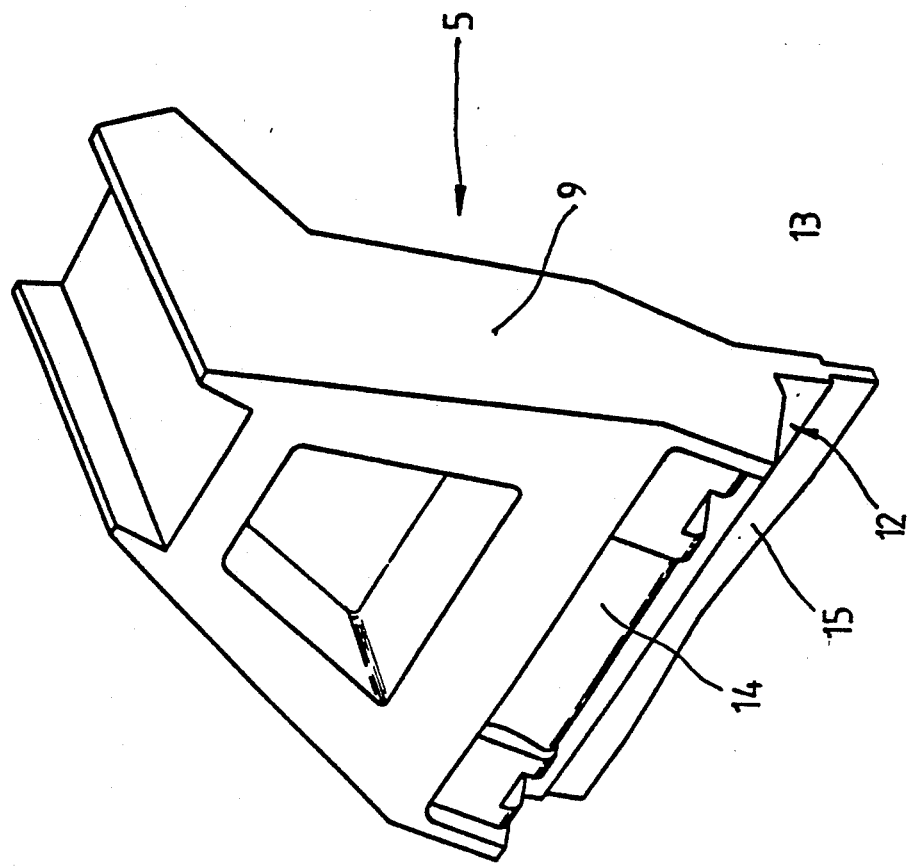
FIG. 3 is a perspective view of a roof rack leg, being a component of the leg assembly of FIG. 1 drawn to a smaller scale.
Figure 2:
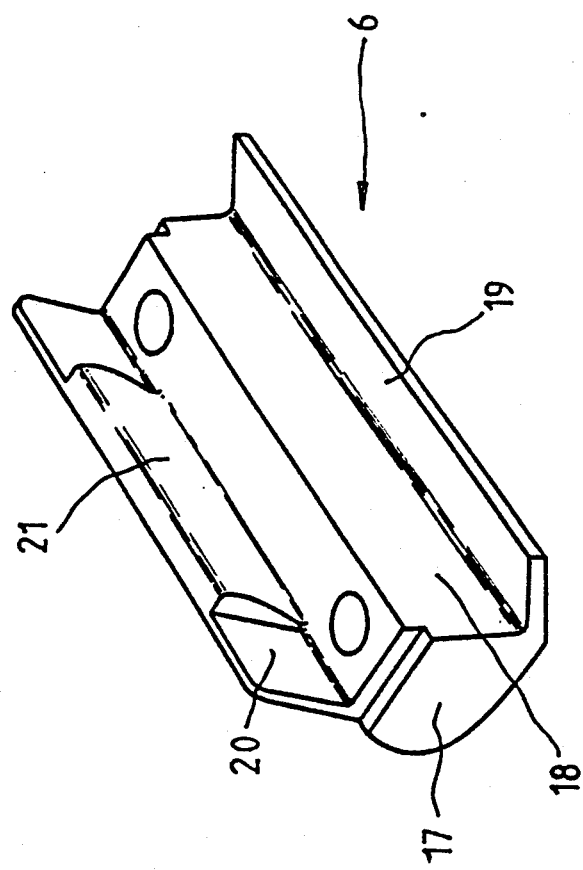
FIG. 2 is a perspective view of a clamping element, being a component of the leg assembly of FIG. 1 drawn to a smaller scale.

The illustrated embodiment comprises a leg 5, a clamping element 6 and two draw-bolts 7 each extending through cylindrical nuts 8.

The leg 5 is a rigid plastics moulding, for example an injection moulding of glass filled nylon, and comprises a substantial columnar portion 9 with a channel shaped upper end portion 10 adapted to receive a roof rack cross-bar 11. The bar 11 may be any conventional bar and may be secured to the leg 5 by conventional clamping bolts (not shown) extending through the floor of the channel in leg portion 10.

Figure 4:
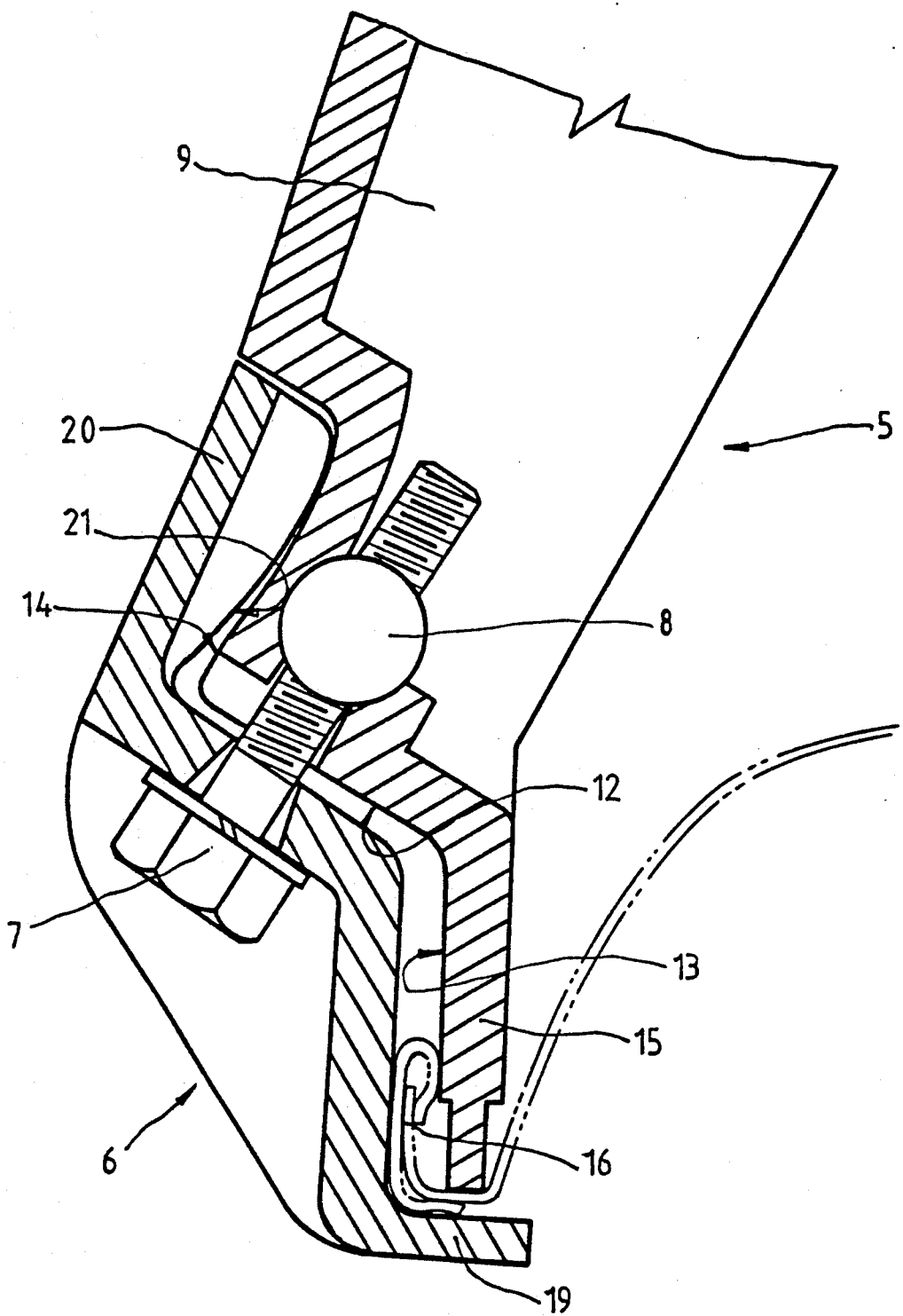
FIG. 4 is a vertical section through the clamping element and a bottom part of the leg of the assembly of FIG. 1 taken through a draw-bolt thereof, drawn to a larger scale.

As may best be seen in FIG. 4, the bottom end of the leg 5 presents a more or less downwardly directed central end face 12, flanked by more nearly upright marginal faces 13 and 14 respectively. Marginal face 13 is the outer face of an inner edge flange 15 adapted to enter a vehicle roof gutter 16 with the free end of the flange 15 resting on the floor of the gutter 16 and the lower part of the marginal face 13 contacting the inner surface of the gutter wall.

The marginal face 14 is concave outwardly so that at least its upper part is inclined outwardly of the axis of the draw bolt 7, that surface constitutes a camming surface, as that term is used herein.

It will be seen that the nut 8 is received in a part cylindrical cradle formation enabling it to rotate about its cylindrical axis to a limited extent.

The clamping element 6 comprises a body 17 pierced by tapered clearance holes for the bolts 7. The lower inner face 18 of the body 17 is adapted to bear against the outer surface of the wall of the gutter 16, while a lower edge flange 19 extends under the gutter to bear against the floor thereof.

An upper edge flange 20 has a convex inner surface 21 adapted to bear against the camming surface 14 of the leg 6.

When the parts are assembled as seen in FIGS. 1 and 4, and the draw bolts 7 are tightened, the clamping element 6 is drawn upwardly towards the leg 5 so as to bear against the gutter. Towards the end of the tightening action the contact between the clamping element and the camming surface moves the upper part of the clamping element outwardly to bring the lower inner face 18 into firm engagement with the wall of the gutter 16. That movement is enabled because of the ability of the draw bolts 7 to align themselves as needed.

The claims defining the invention are as follows.

I claim:

1. A leg assembly for a vehicle roof rack comprising a rigid leg adapted to be fastened to a cross-beam and having a projecting inner edge flange adapted to enter a vehicle roof gutter to sit upon the floor thereof, a clamping element itself comprising a body adapted, in use, to bear against the outer surface of the gutter wall and having a lower edge flange then projecting under the gutter and an upwardly extending upper edge flange having an upper part with a convex inner surface adapted to bear against an outwardly inclined camming surface on the outside of the leg, and at least one self-aligning draw bolt to draw the clamping element upwardly towards the leg, the line of action of the draw bolt extending through the clamping element intermediate of said edge flanges, wherein towards the end of the tightening action the contact between the convex surface of the clamping element and the camming surface moves the upper part of the clamping element outwardly to bring the lower inner face into firm engagement with the wall of the gutter thereby enabling the clamping element to be loaded inwardly against the outer wall of the gutter as well as being loaded upwardly against the floor of the gutter.

2. A leg assembly according to claim 1 wherein a lower inner face of the clamping element body is adapted to bear against the outer surface of the wall of the gutter while the lower edge flange extends under the gutter to bear against the floor thereof.

3. A leg assembly according to claim 1 further comprising at least one part cylindrical cradle formation in the leg each adapted to receive a cylindrical nut through which said at least one draw bolt extends.

4. A leg assembly according to claim 1 wherein the leg further comprises a substantial columnar portion with a channel shaped upper end portion adapted to receive a roof rack cross-bar.

5. A leg assembly according to claim 1 wherein the leg further comprises a bottom end adapted to present a more or less downwardly directed central end face, flanked by more nearly upright marginal faces.

6. A leg assembly according to claim 5 wherein one marginal face is the outer face of an inner edge flange adapted to enter a vehicle roof gutter with the free end of the flange resting on the floor of the gutter and the lower part of the marginal face contacting the inner surface of the gutter wall.

7. A leg assembly according to claim 5 wherein another marginal face is concave outwardly so that at least its upper part is inclined outwardly of the axis of the draw bolt, that surface constituting said camming surface.

8. A leg assembly according to claim 1 wherein the clamping element body is pierced by tapered clearance holes for the bolts.

9. A leg assembly for a vehicle roof rack comprising a rigid leg adapted to be fastened to a cross-beam and having a projecting inner edge flange adapted to enter a vehicle roof gutter to sit upon the floor thereof, a clamping element itself comprising a body adapted, in us, to bear against the outer surface of the gutter wall and having a lower edge flange then projecting under the gutter and an upwardly extending upper edge flange having an upper part with a convex inner surface adapted to bear against an outwardly inclined concave camming surface on the outside of the leg, the line of action of the draw bolt extending through the clamping element intermediate of said edge flanges, wherein towards the end of the tightening action the contact between the convex surface of the clamping element and the camming surface moves the upper part of the clamping element outwardly to bring the lower inner face into firm engagement with the wall of the gutter thereby enabling the clamping element to be loaded inwardly against the outer wall of the gutter as well as being loaded upwardly against he floor of the gutter.

10. A leg assembly for a vehicle roof rack comprising rigid leg means for fastening to a cross-beam and having a projecting inner edge flange means for entering a vehicle roof gutter to sit upon the floor thereof, a clamping element comprising body means for bearing against the outer surface of the gutter wall with a lower edge flange then projecting under the gutter and an upwardly extending upper edge flange having an upper part with a convex inner surface means for bearing against an outwardly inclined camming surface on the outside of the leg, and at least one self-aligning draw bolt means for drawing the clamping element upwardly towards the leg, the line of action of the draw bolt means extending through the clamping element intermediate of said edge flanges, wherein towards the end of the tightening action the contact between the convex surface means of the clamping element and the camming surface moves the upper part of the clamping element outwardly to bring the lower inner face into firm engagement with the wall of the gutter thereby enabling the clamping element to be loaded inwardly against the outer wall of the gutter as well as being loaded upwardly against the floor of the gutter.

* * * * *